United States Patent
Waas-Russiyan et al.

[11] Patent Number: 6,108,874
[45] Date of Patent: Aug. 29, 2000

[54] METHOD AND APPARATUS FOR A MEDAL TO RIBBON JOINER

[76] Inventors: Cinthia E. Waas-Russiyan; Nicholas Russiyan, both of Deer Trail, Sugar Loaf, N.Y. 10981

[21] Appl. No.: 09/161,247

[22] Filed: Sep. 25, 1998

Related U.S. Application Data

[63] Continuation-in-part of application No. 08/958,059, Oct. 27, 1997, abandoned.

[51] Int. Cl.$^7$ ..................................................... A44C 3/00
[52] U.S. Cl. ............................ 24/3.4; 24/598.6; 224/257
[58] Field of Search ..................... 24/3.4, 3.13, 598.7, 24/579.1, 601.8, 598.4, 265 H, 298, 301, 302, 363, 366, 194, 200, 265 EC, 601.1, 601.2, 601.3, 599.6, 599.8; 63/3, 3.1, 20, 1.14, DIG. 3; D11/98; 224/257, 265, 268, 269, 910, 603, 604, 605; 2/311, 313, 314

[56] References Cited

U.S. PATENT DOCUMENTS

| | | | |
|---|---|---|---|
| 167,399 | 9/1875 | Goodrich | 24/601.3 |
| 390,629 | 10/1888 | Tyler | 24/598.6 |
| 831,083 | 9/1906 | Lewis | 24/601.3 |
| 910,238 | 1/1909 | Shaw | 224/257 |
| 1,377,676 | 5/1921 | Gaunt | 40/1.5 |
| 2,572,889 | 10/1951 | Strykower | 24/3.4 X |
| 5,092,018 | 3/1992 | Seron | 24/3.4 |
| 5,450,661 | 9/1995 | Rekuc | 24/599.6 |

*Primary Examiner*—Anthony Knight
*Assistant Examiner*—Robert J. Sandy
*Attorney, Agent, or Firm*—Malin, Haley & DiMaggio, P.A.

[57] ABSTRACT

An improved method and apparatus for attaching an award to a ribbon having a stitched ribbon end loop for securely receiving and holding a ribbon anchor bar, and an improved fastener having a ribbon anchor bar and a fastening clip. The improved fastener is made of a bendable single piece of resilient, thin wire having a preformed memory. The fastening clip has an opening which is formed by two free ends. One free end is twisted and positioned underneath and against the other free end for creating tension in said lower free end against the upper free end. The other free end is above and against the first free end for creating tension in the lower free end against the upper free end. An open position is obtained by pressuring the first free end down to insert an award therein. By releasing the pressure, first free end resumes its initial closed position to hold the award in place. Alternatively, the improved ribbon has a anchor member having a hole for receiving an opposite end of a fastening member. The opposite end has at least a portion where the diameter is bigger than the diameter of the second opposite side of the anchor. This prevents the opposite end of the fastening member from sliding down through the opening.

11 Claims, 4 Drawing Sheets

METHOD AND APPARATUS FOR A MEDAL TO RIBBON JOINER

This is a continuation-in-part of application Ser. No. 08/958,059 filed on Oct. 27, 1997 now abandoned.

BACKGROUND OF THE INVENTION

1. Field of the Invention

This invention relates to awards ribbons and an improved fastener for attaching a medal or any other award display device to the award ribbon.

2. Description of the Background Art

Personal awards that can be attached to a person's clothing or hand-held for achievement, whether serious or humorous, are well known in the prior art. One such type award is traditionally constructed of a fabric material, like a ribbon, which can be mounted around a person's neck or pinned to garments to show a particular achievement. Further, the decorative awards ribbon or ribbons may include one or more awards to show the specific achievements for particular award presentations. In such a device, the ribbon may be a loop of narrow fabric band, decoratively colored, having a stitched fastener for receiving an award integrally connected to a predetermined portion of the ribbon. The construction of adding an award fastening ring or bar integrated into the ribbon by sewing techniques is time consuming and costly. Typically, an additional fastener must be made and attached to the award support that has been integrated into the ribbon by sewing. Finally, the award is then attached to a clip-like fastener, which itself has been attached to the award fastener attached to the ribbon. All of this is an expensive and time consuming structure to attach the award to the ribbon.

The act of attaching award fasteners to awards ribbons has always been a time consuming and labor intensive process. The prior art shows awards ribbons having metal eyelets at their ends for receiving a ring or clip. The ring or clip has to be twisted open for receiving an award. The labor, time, and cost involved with this process has proved to be ineffective.

One of the latest developments in the industry was to replace the eyelet by a ribbon neck for receiving a jump ring and a separate, flexible clip. This also proved to be ineffective because it added the cost of the separate, flexible clip to the manufacturing of the ribbon.

Therefore, there exists a need for an inexpensive and cost effective awards ribbon having a fastener which combines the functions of a jump ring and a clip and allows for an easy way to attach an award to an awards ribbon without any labor intensive steps. The present invention incorporates these characteristics and eliminates the problems found in the prior art.

There also exists a need for an inexpensive and cost effective awards ribbon having a fastener which allows for free rotation of the award.

SUMMARY OF THE INVENTION

The present invention comprises an awards ribbon made of a band of fabric formed in a loop and having angled cut ends and joined at both ends in a distinctive V-shaped ribbon formed end loop which incorporates an improved fastener. The improved fastener is attached within the ribbon formed end loop at the manufacturing stage of the ribbon. The improved fastener is made of a bendable single piece of resilient thin wire having memory preformed in a predetermined shape to have a ribbon anchor bar integrated with a fastening clip. The bar portion of the wire is securely enclosed within the ribbon formed end loop by sewing fabric. The opposite end of the improved fastener has a hook-like shape with an opening for receiving an award or any other award of likely shape and size. The opening is formed by two free ends that are close together but spreadable. A first free end of the wire is twisted and positioned underneath and against a second free end for causing tension against the second free end. Pushing down the first free end causes the opening to be placed in an open position, allowing for an award having a hole, a ring, or similar device to be inserted into the second free end. Releasing the pressure from the first free end of the wire causes the first free end by memory to resume its original position against the second free end and return to a closed position.

It is an object of the present invention to provide an easy and low cost apparatus and method for manufacturing awards ribbons that have an award fastener.

It is a further object of the present invention to provide an improved single-piece fastener which can be securely attached to an awards ribbon end for receiving medals or similar devices.

It is still an object of the present invention to eliminate the need to use more than one fastener element to attach a medal or similar device to an awards ribbon.

It is also an object of the present invention to incorporate the functions of a jump ring and of a clip to one single fastener element to attach a medal or similar device to an awards ribbon.

A principal object of the present invention is to provide a single-piece fastener for securely attaching the ribbon to one end of the fastener and for attaching a medal or similar device to the opposite end of said fastener.

In accordance with these and other objects which will become apparent hereinafter, the instant invention will now be described with particular reference to the accompanying drawings.

BRIEF DESCRIPTION OF THE DRAWINGS

For a more complete understanding of the present invention and for further advantages thereof, the following Detailed Description of the preferred embodiments makes reference to the accompanying Drawings, wherein the same reference numerals refer to the same or similar elements through the Figures, as follows.

DESCRIPTION OF THE PREFERRED EMBODIMENTS

Figure 1:
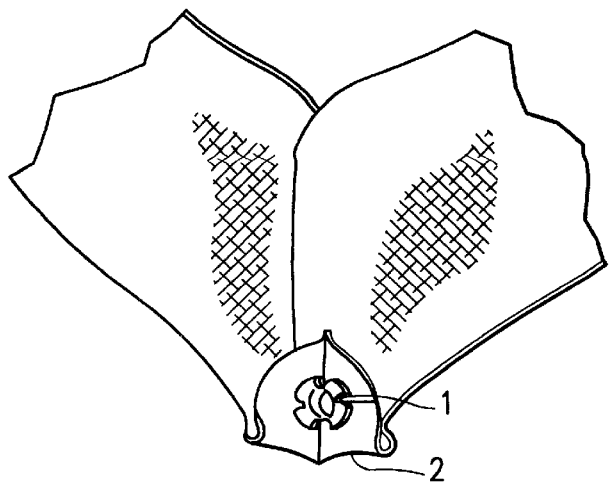
FIG. 1 is a front elevational view of a prior art award fabric ribbon neck and fastener which uses an eyelet to receive additional fasteners, partially cut away.

Referring now to the figures, FIG. 1 shows a prior art embodiment which comprises an eyelet 1 securely attached to the end 2 of an awards ribbon.

Figure 2:
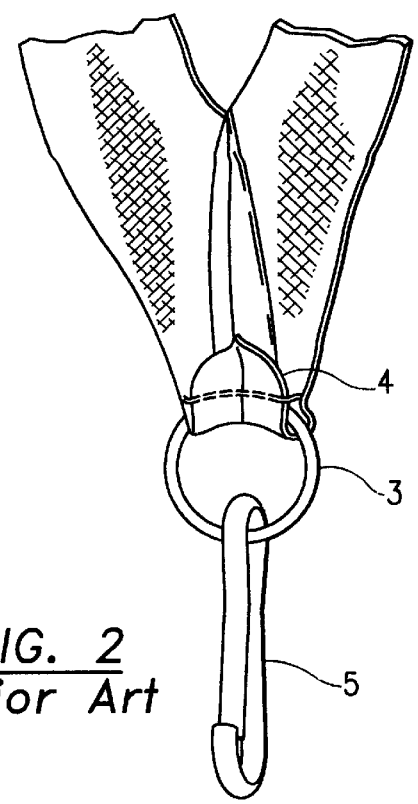
FIG. 2 is a back elevational view, partially cut away, of a prior art ribbon neck which uses a jump ring and a clip to receive and fasten an award.

FIG. 2 shows another prior art embodiment which comprises a jump ring 3 securely enclosed inside a ribbon neck 4. Attached to the jump ring 3 is a clip 5 for holding an award (not shown).

Figure 3:
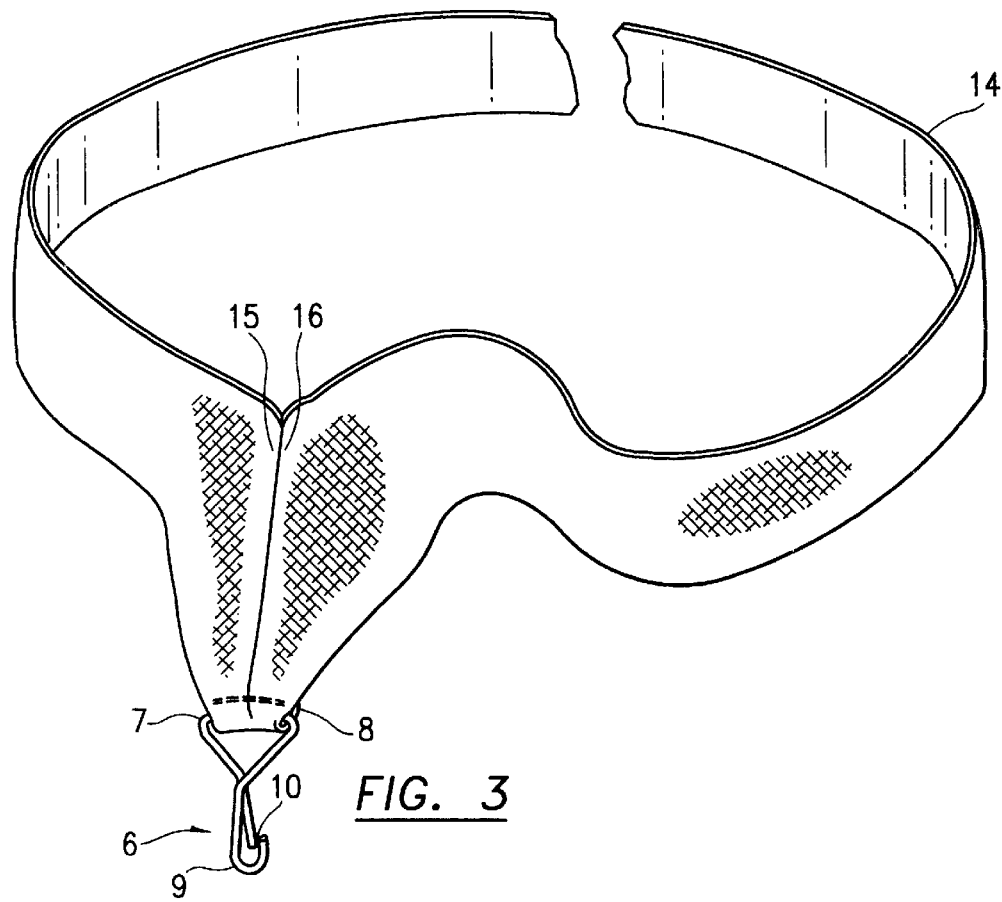
FIG. 3 is a front elevational view of the first preferred embodiment of the present invention.
Figure 6:
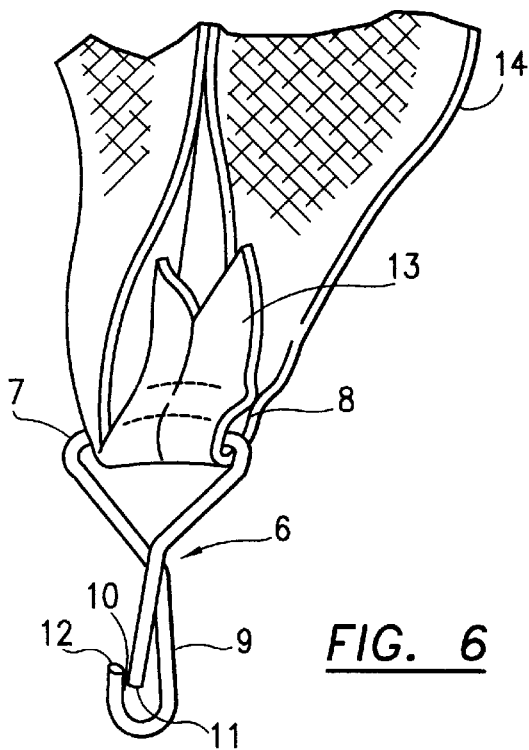
FIG. 6 is a back elevational view of the first preferred embodiment of the present invention.

Now, referring to the present invention, FIGS. 3 and 6 show the present invention which comprises an awards ribbon 14 made of a band of fabric having angled ends 15 and 16 and formed in a loop joined at both ends in a V-shaped formed end loop 8 which incorporates an improved fastener 6 having a ribbon anchor bar 7 and a fastening clip 9.

Figure 4:
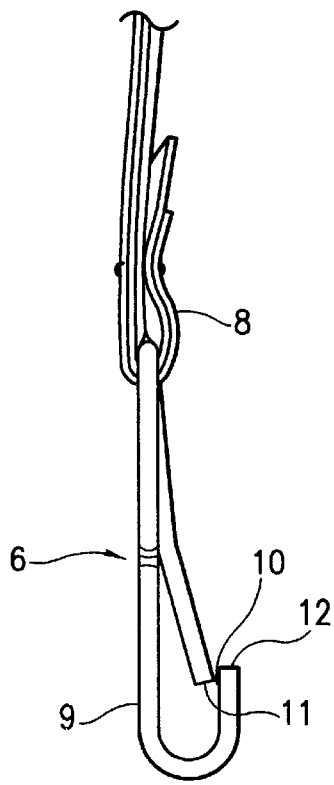
FIG. 4 is a side elevational view of the improved fastener attached to a fabric ribbon neck.
Figure 5:
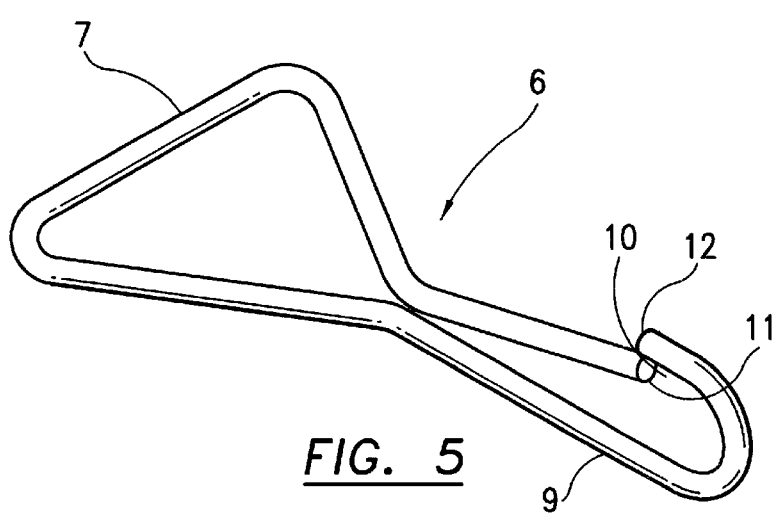
FIG. 5 is a perspective view of the improved fastener used with the invention.

FIG. 5 better shows improved fastener 6 which is preferably made of a bendable single piece of resilient, thin wire having memory preformed in a predetermined shape to have a ribbon anchor bar 7 integrated with a fastening clip 9. Improved fastener 6 may also be made of a single piece of resilient thin molded plastic with the same characteristics described herein. As better shown in FIGS. 4 and 6, ribbon anchor bar 7 is securely enclosed inside the ribbon formed end loop 8, preferably at the manufacturing stage of the ribbon by folding stitched ribbon end 13 and enclosing ribbon anchor bar 7 therein before attaching, either by sewing, gluing, stapling, or similar means, stitched ribbon end 13 to ribbon 14.

As better shown in FIG. 4, fastening clip 9 of the improved fastener 6 has hook-like shape with an opening 10 for receiving an medal (not shown) or any other award of likely shape and size. As shown in FIG. 5, opening 10 is formed by two free ends 11 and 12 which are close together, but spreadable. Referring now to FIG. 6, free end 11 is twisted and positioned underneath and against free end 12 for causing tension against free end 12. As shown in FIG. 4, twisted free end 11 overlaps is positioned underneath and against free end 12, causing tension against it, which results in opening 10 being tightly closed. Free end 12 is positioned above and against free end 11. The tension resulting from free end 11 being twisted presses free end 11 against free end 12 allowing opening 10 to remain tightly closed unless free end 11 is pushed down to an open position.

By slightly pressuring free end 11 down, opening 10 is placed on an open position, allowing the insertion of a medal or similar device around free end 12. Releasing the pressure on free end 11 causes free end 11 by memory to resume the original closed position, then preventing a medal or similar device from being involuntarily or accidentally released from free end 12.

Figure 7:
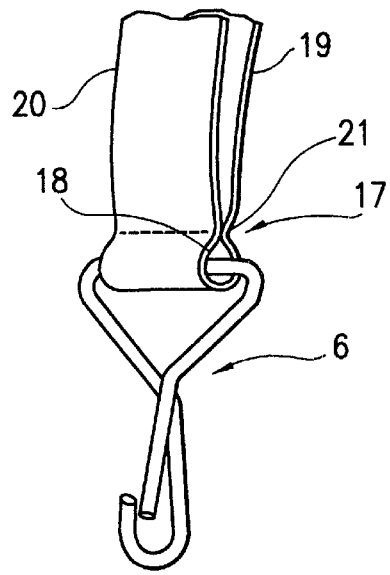
FIG. 7 is a front elevational view of an alternative embodiment of the present invention.

FIG. 7 shows an alternative embodiment of the present invention which comprises an awards ribbon 17 made of a band fabric to form a loop 18 at one of its ends which incorporates improved fastener 19. Loop 18 is formed by placing ribbon side 19 parallel with ribbon side 20 and securely attaching ribbon side 19 to ribbon side 20 at the overlapping zone 21 by gluing, stitching, stapling or similar means. Loop 18 is formed and received improved fastener 19 at the manufacturing stage of awards ribbon 17. Alternatively, ribbon side 19 may be placed over ribbon side 20 in a cross-like manner to form a loop which will receive anchor bar 7 of the improved fastener.

Figure 8:
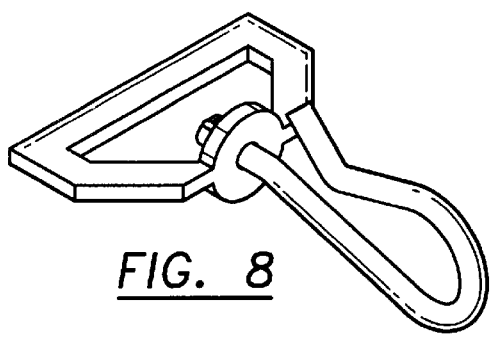
FIG. 8 is a perspective view of the second preferred embodiment of the present invention.
Figure 10:
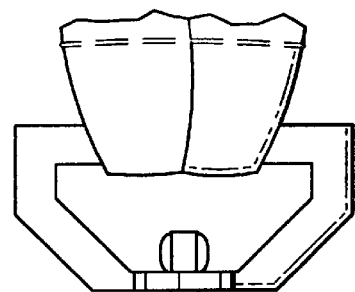
FIG. 10 is a side elevational view of the second preferred embodiment of the present invention.

A second preferred embodiment of the present invention is shown in FIGS. 8 to 13. FIG. 8 better shows improved fastener 22 which has a ribbon anchor element 27 and a fastening clip 23. Both, the ribbon anchor element 27 and the fastening clip 23 are preferably made of a resilient material. As shown in FIGS. 10, 11, 12 and 13, ribbon anchor element 27 has ribbon anchor bar 28 which is securely enclosed within ribbon formed end loop 8. As better shown in FIGS. 8 and 10, fastening clip 23 has a free end 24 and an opposite end 25.

Figure 9:
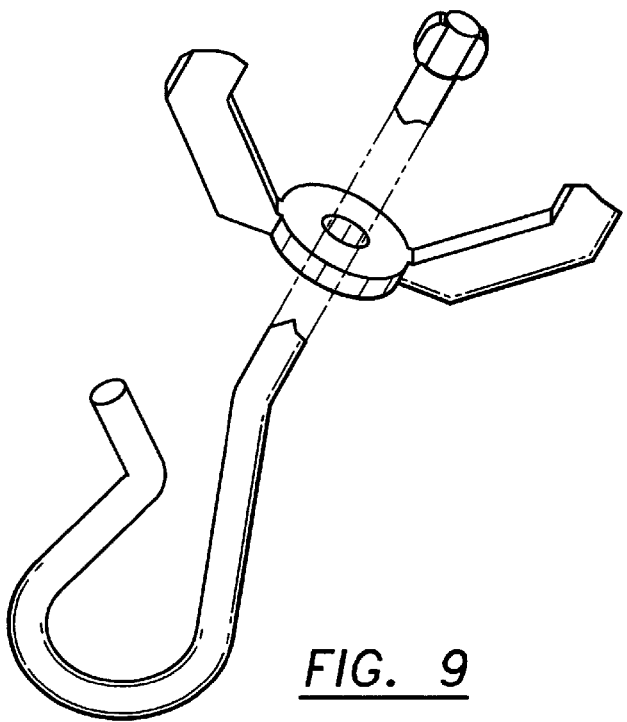
FIG. 9 is an exploded partial view of the improved fastener of the present invention.

As shown in FIG. 9 anchor element 27 has a hole 29 which receives opposite end 25 of fastening clip 23. Opposite end 25 is safely secured within hole 29 by wings 30 and 31 of opposite end 25. Wings 30 and 31 of opposite end 25 function as a stopper, thus preventing opposite end 25 from sliding out of hole 29. Because the diameter of bar 32 which forms fastening clip 23 is smaller than the diameter of hole 29, it allows for free movement of bar 32 inside of hole 29 and free and full rotation of fastening clip 23.

Figure 11:
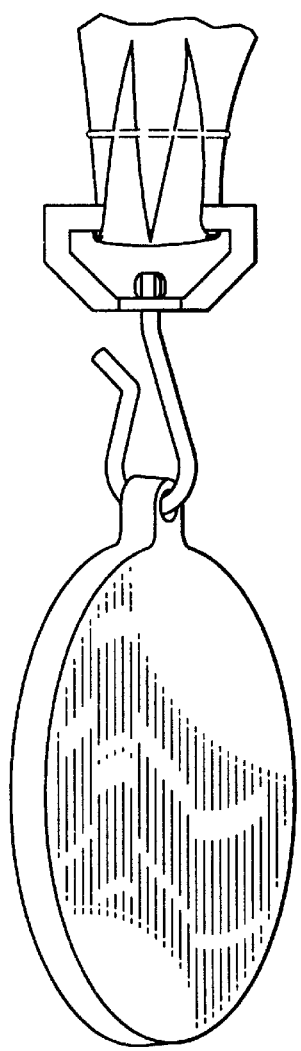
FIG. 11 is a side elevational view of the second preferred embodiment of the present invention attached to a medal.
Figure 13:
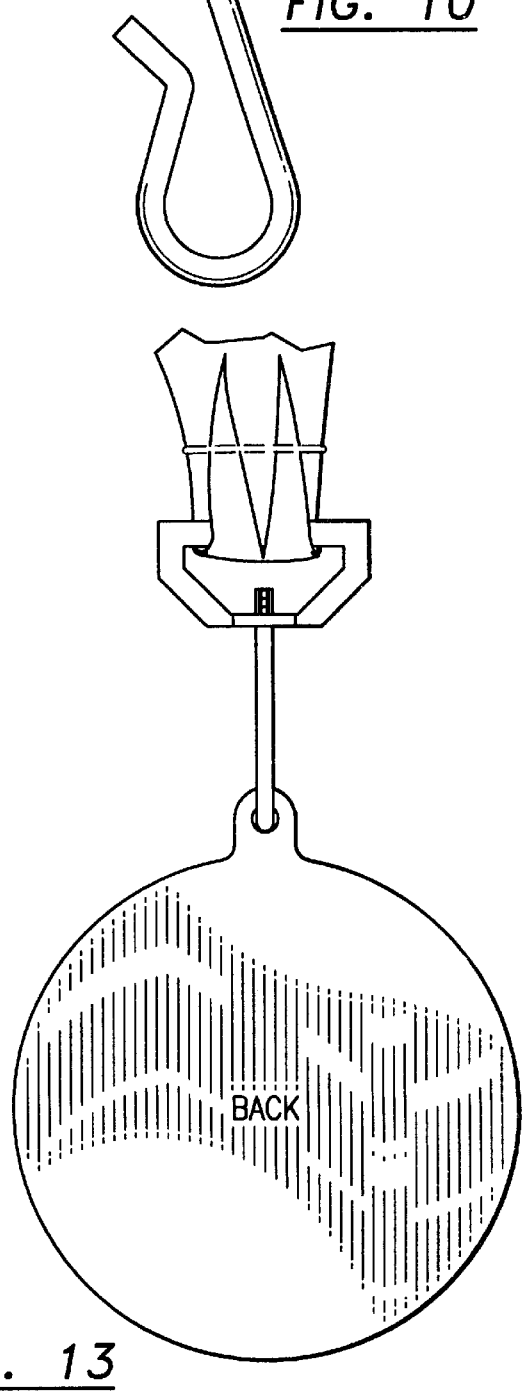
FIG. 13 is a back elevational view of the second preferred embodiment of the present invention attached to a medal.
Figure 12:
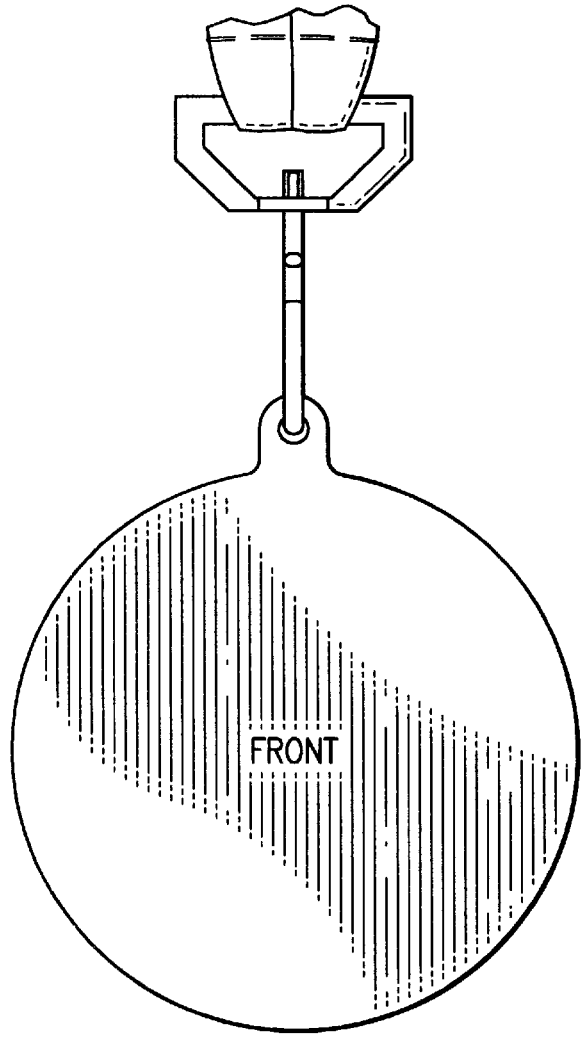
FIG. 12 is a front elevational view of the second preferred embodiment of the present invention attached to a medal.

FIGS. 11, 12 and 13 shows a medal 26 within fastening clip 23. By slightly pressing down free end 24 of fastening clip 23 inside ring 33 of medal 26, free end 24 engages inside ring 33 and holds the medal in place. Because fastening clip 23 can freely swirl inside anchor element hole 29, there is no need to choose the right position for the medal before its ring 33 is engaged inside free end 24. As shown in FIGS. 11, 12 and 13, medal 26 can be placed on any position after it is already in place within fastening clip 23: on its side, as shown in FIG. 11, on its back as shown in FIG. 12, or on its front, as shown in FIG. 13.

The present invention has been shown and described herein in what is considered to be the most practical and preferred embodiment. It is recognized, however, that departures may be made therefrom within the scope of the invention and that obvious modifications will occur to a person skilled in the art.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A ribbon having an elongated fabric band and a resilient fastener for displaying an award comprising: said elongated fabric band having an end loop for receiving said resilient fastener with a preformed memory, wherein said fastener has first and second opposite ends, said fastener first opposite end including an anchor bar securely attached into said end loop and said second opposite end including a fastening clip having an opening for receiving an award and securely holding said award therein;

said opening comprising first and second free ends, each having a base and a tip, said first free end having a preformed memory whereby said first free end tip rests underneath said tip of said second free end thereby creating tension against said tip of said second free end for securely holding said award therein, whereby said first free end is not wrapped around any portion of said second free end; and said second free end tip overlaps said first free end tip and rests above and against said first free end tip for creating tension in said first free end against said second free end for securely holding said award therein.

2. The ribbon as claimed in claim 1 wherein said ribbon has two angled ends attached together and folded to form an end loop for receiving and securely holding said fastener.

3. A fastener for attaching an award to a ribbon comprising: said ribbon having an end loop for receiving a first opposite end of said fastener, wherein said first opposite end includes an anchor bar for securely attaching said ribbon to said fastener, said fastener having a second opposite end having a fastening clip for securely attaching said award to said ribbon, said fastening clip comprising an opening having first and second free ends each having a base and a tip, wherein said first free end has a preformed memory for resuming a first position and securely holding said award in place;

said first free end tip rests underneath and against said second free end tip for creating tension against said tip of said second free end and for securely holding said award therein, whereby said first free end is not wrapped around any portion of said second free end; and said second free end tip overlaps said first free end tip and rests above and against said first free end tip for creating tension in said first free end against said second free end for securely holding said award therein.

4. An apparatus as claimed in claim 3 wherein said ribbon has two angled ends attached together and folded to form an end loop for receiving and securely holding said fastener.

5. A method for attaching an award to a ribbon using an improved fastener, comprising the steps of:

removably inserting said ribbon through either a first end or an opposite second end of said fastener;

sliding said ribbon along said fastener;

pressing down said first end;

inserting said award into an opening created between said first end and said second opposite end;

releasing the pressure on said first end for resuming a first closed position; and wherein said ribbon includes a ribbon end loop and said first end includes an anchor bar to receive said ribbon end loop and said first end and said second opposite end create an opening for receiving an award therein, said first end creates tension against said second end by resting underneath and against said second end for receiving and securely holding said award therein, whereby said first end is not wrapped around any portion of said second end and said second end being bent in a different direction from said opposite end for allowing said award to easily slide through said second end.

6. A ribbon for displaying an award comprising an elongated fabric band having an end loop for receiving an anchor, wherein said anchor has at least two opposite first and second sides, said opposite first side for securely attaching said anchor to said fabric band, said opposite second side including a hole having a diameter, said hole for receiving a fastener, said fastener comprising a bent bar having a free end and an opposite end, wherein said free end is bent in a different direction from said opposite end for allowing said award to easily slide through said free end, said opposite end having at least a portion where the diameter is bigger than said diameter of said anchor hole, for preventing said opposite end from sliding out of said anchor hole, said opposite end also having a portion where its diameter is smaller than the diameter of the anchor hole for allowing said opposite end to freely rotate inside said anchor hole.

7. An apparatus as claimed in claim 6, wherein said ribbon has two angled ends attached together and folded to form an end loop for receiving and securely holding said fastener.

8. An apparatus as claimed in claim 6, wherein said free end is slightly bent for receiving said award and securely holding said award in place.

9. A fastener for attaching an award to a ribbon comprising: a ribbon, an anchor and a fastening member, said ribbon having an end loop for receiving a first opposite end of said anchor for securely attaching said ribbon to said anchor, said anchor having a second opposite end having a hole for receiving an opposite end of said fastening member, wherein said opposite end of said fastening member has at least a portion where the diameter which is bigger than the diameter of said hole for holding said second opposite end of said fastening member within said anchor, and said fastening member further comprising a bar, said bar being bent in a different direction from said second opposite end of said fastening member for allowing said award to easily slide through said free end, and said bar having a diameter which is smaller than the diameter of said anchor hole for allowing free rotation of a portion of said bar inside said anchor hole.

10. An apparatus as claimed in claim 9, wherein said ribbon end loop is formed by two angled ends attached together and folded for receiving and securely holding said fastener.

11. A method for attaching an award to a ribbon using an improved fastener, comprising the steps of:

securely attaching a first opposite end of an anchor into a ribbon end loop;

inserting said award into an opening of a free end of a fastening member by engaging said free end of said improved fastener inside an opening in said award;

wherein said improved fastener includes an anchor member and said fastening member, said anchor member including an anchor bar to be inserted into said ribbon end loop and a second opposite end having a hole for receiving an opposite end of said fastening member, said opposite end of said fastening member having a diameter which is bigger than the diameter of said hole for preventing said opposite end of said fastening member from sliding through said hole, said fastening member further having a fastening bar and said free end, said fastening bar having a diameter which is smaller than the diameter of the anchor hole for allowing free rotation of said fastening bar within said hole, said free end being bent in a different direction from said opposite end of said fastening member for allowing said award to easily slide through said free end.

* * * * *